United States Patent [19]

Ookawa

[11] 4,332,442
[45] * Jun. 1, 1982

[54] REPRODUCING OBJECTIVE FOR VIDEO DISKS

[75] Inventor: Kaneyas Ookawa, Tokyo, Japan

[73] Assignee: Olympus Optical Co., Ltd., Tokyo, Japan

[ * ] Notice: The portion of the term of this patent subsequent to Mar. 24, 1998, has been disclaimed.

[21] Appl. No.: 143,123

[22] Filed: Apr. 23, 1980

[30] Foreign Application Priority Data

May 4, 1979 [JP] Japan ................................ 54-55019

[51] Int. Cl.³ ............................................. G02B 9/34
[52] U.S. Cl. .................................. 350/469; 350/414
[58] Field of Search .............................. 350/469, 414

[56] References Cited

U.S. PATENT DOCUMENTS

| | | | |
|---|---|---|---|
| 3,915,559 | 10/1975 | Fleischman | 350/469 |
| 3,942,877 | 3/1976 | Fleischman | 350/469 |
| 3,944,338 | 3/1976 | Fleischman | 350/469 |
| 4,065,205 | 12/1977 | Fleischman | 350/469 X |
| 4,206,977 | 6/1980 | Goto | 350/469 |
| 4,257,679 | 3/1981 | Okawa | 350/469 |

FOREIGN PATENT DOCUMENTS 54-127339 10/1979 Japan ................................ 350/469

Primary Examiner—F. L. Evans
Assistant Examiner—Scott J. Sugarman
Attorney, Agent, or Firm—Cushman, Darby & Cushman

[57] ABSTRACT

A reproducing objective for video disks comprising a first, second, third and fourth lenses in the order from the reproducing light source side, the first lens being a biconvex or plano-convex lens, the second lens being a negative meniscus lens, the third lens being a biconvex or plano-convex lens, the fourth lens being a positive meniscus lens, at least one of these lenses being arranged as a plastic lens, the reproducing objective being extremely light in weight and having a long working distance and high resolving power.

15 Claims, 15 Drawing Figures

REPRODUCING OBJECTIVE FOR VIDEO DISKS

BACKGROUND OF THE INVENTION (a) Field of the invention

The present invention relates to a reproducing objective for video disks.

(b) Description of the prior art

For reproduction of signals recorded on a video disk, the method to make the objective perform fine oscillation is often adopted in order to correct the tracking error as well as the method to oscillates a galvano-mirror. In this method, the objective performs fine oscillation of about 10 to 90 Hz. Therefore, the objective should be small in size and light in weight as far as possible. Besides, the objective should be located at least at a certain distance from the video disk surface. Otherwise, the objective will contact the disk surface in actual use and will cause damage to the disk. Therefore, the objective for video disks should have a long working distance.

However, in case of known objective for video disks comprising lenses made of optical glass, it is impossible to satisfy the requirements to make the objective small in size and light in weight though it is possible to make the working distance long. Especially, the requirement to make the objective small in size is not satisfied. To solve the above-mentioned problem, objectives for video disks comprising lenses made of plastics (plastic lenses) are also known. However, in case of those objectives, the working distance is short and insufficient and, moreover, the resolving power is lower compared with objectives for video disks comprising lenses made of optical glass though it is possible to make the objective satisfactorily light in weight.

SUMMARY OF THE INVENTION

It is, therefore, a primary object of the present invention to provide a high-performance reproducing objective for video disks in which at least one of lenses constituting the objective is arranged as a plastic lens in order to satisfy the requirement to make the objective light in weight and, moreover, for which the working distance is made long and resolving power is made high to the same degree as those of known objectives for video disks comprising lenses made of optical glass.

The reproducing objective for video disks according to the present invention has four-element lens configuration as shown in FIG. 1, i.e., it comprises a first, second, third and fourth lenses in the order from the reproducing light source side. The first lens is a biconvex or plano-convex lens, the second lens is a negative meniscus lens, the third lens is a biconvex or plano-convex lens and the fourth lens is a positive meniscus lens. Out of the above-mentioned lenses, at least one lens is arranged as a plastic lens. Besides, the reproducing objective for video disks according to the present invention satisfies the following conditions (1) through (6):

(1) $2.1f < f_1 < 3.2f$
(2) $-55f < f_2 < -3.9f$
(3) $1.3f < f_4 < 2.4f$
(4) $f < r_8 < 2.3f$
(5) $d_2 < 0.1f$
(6) $0.5f < d_4$ wherein reference symbols $f_1$, $f_2$ and $f_4$ respectively represent focal lengths of the first, second and fourth lenses, reference symbol $r_8$ represents the radius of curvature of surface on the video disk side of the fourth lens, reference symbol $d_2$ represents the airspace between the first and second lenses, reference symbol $d_4$ represents the airspace between the second and third lenses, and reference symbol f represents the focal length of the lens system as a whole.

Meanings of the above-mentioned conditions are described below.

The condition (1) relates to spherical aberration to be caused by the first lens. When it is intended to correct astigmatism caused by the third and fourth lenses so that astigmatism of the lens system as a whole becomes favourable, the degree of freedom concerning the shape of the first lens is limited to some extent. As a result, spherical aberration is caused by the first lens. The condition (1) is to correct the above-mentioned spherical aberration. When $f_1$ in the condition (1) becomes smaller than $2.1f$, negative spherical aberration to be caused by the first lens becomes too large and it is impossible to favourable correct it by the other lenses. When $f_1$ becomes larger than $3.2f$, it becomes impossible to favourably correct astigmatism to be caused by the third and fourth lenses even when any value is selected for the focal length $f_2$ of the second lens. Moreover, when $f_1$ is larger than $3.2f$, negative spherical aberration to be caused by the first lens is tool small and, therefore, spherical aberration of the lens system as a whole including spherical aberration to be caused by the other lenses will be overcorrected.

The condition (2) is established for the purpose of making the second lens cause positive spherical aberration of adequate value in order to correct negative spherical aberration caused by the first lens. When $f_2$ in the condition (2) becomes smaller than $-55f$, positive spherical aberration to be caused by the second lens becomes too small and, as a result, spherical aberration of the lens system as a whole will be undercorrected. When $f_2$ becomes larger than $-3.9f$, spherical aberration of the lens system as a whole will be overcorrected in conversely to the above.

The condition (3) is established for the purpose of correcting astigmatism favourably. Astigmatism will be undercorrected when $f_4$ in the condition (3) becomes smaller than $1.3f$ and will be overcorrected when $f_4$ becomes larger than $2.4f$ and neither case is desirable.

The condition (4) is established for the purpose of favourably correcting astigmatism like the condition (3). To make the working distance long, it is desirable to make the radius of curvature of surface on the video disk side of the fourth lens small. That is, the working distance becomes longer when $r_8$ is made smaller. When, however, $r_8$ is made too small, astigmatism will be overcorrected. The lower limit f for $r_8$ is to define the limit so that the above-mentioned radius of curvature will not be made too small. When $r_8$ becomes larger than $2.3f$, astigmatism will be undercorrected.

The condition (5) relates to coma. When $d_2$ in the condition (5) becomes larger than $0.1f$, it becomes difficult to correct coma favourably. When $d_2$ is made smaller, it is desirable for the manufacture of lens because it is then possible to make the shape of the first lens more convenient for the manufacture.

As for the condition (6), it is possible to make the lens system smaller when $d_4$ is smaller. When, however, $d_4$ becomes smaller than $0.5f$, coma and curvature of field will be caused to the degree that it will be impossible to correct them by varying the radii of curvature of lens surfaces. From the view point for making the working distance long, it is more advantageous when $d_4$ is larger.

DETAILED DESCRIPTION OF THE PREFERRED EMBODIMENTS

Figure 1:
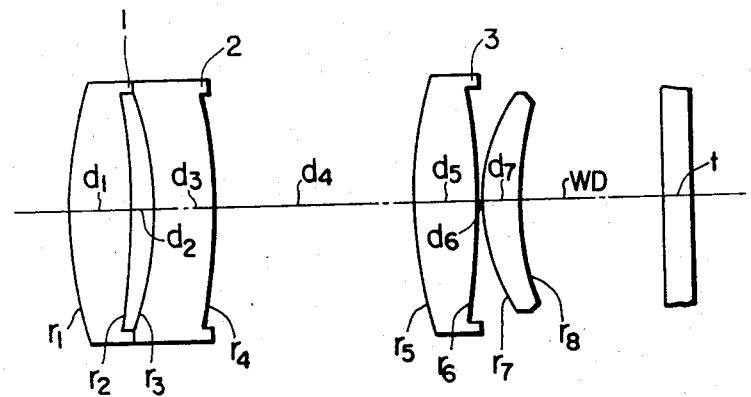
FIG. 1 shows a sectional view of the reproducing objective for video disks according to the present invention.
Figure 2:
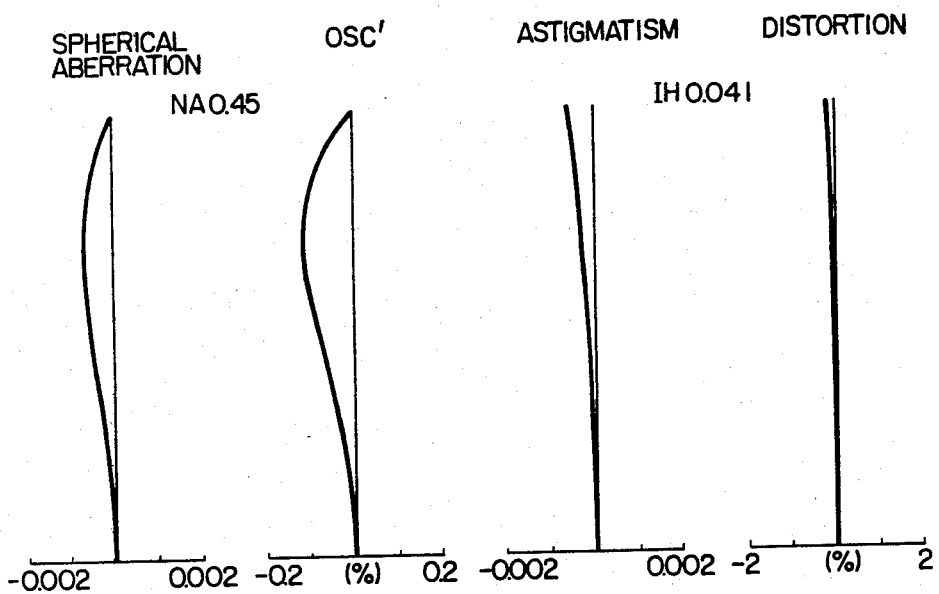
FIGS. 2 through 15 respectively show graphs illustrating aberration curves of Embodiments 1 through 14 of the present invention.
Figure 3:
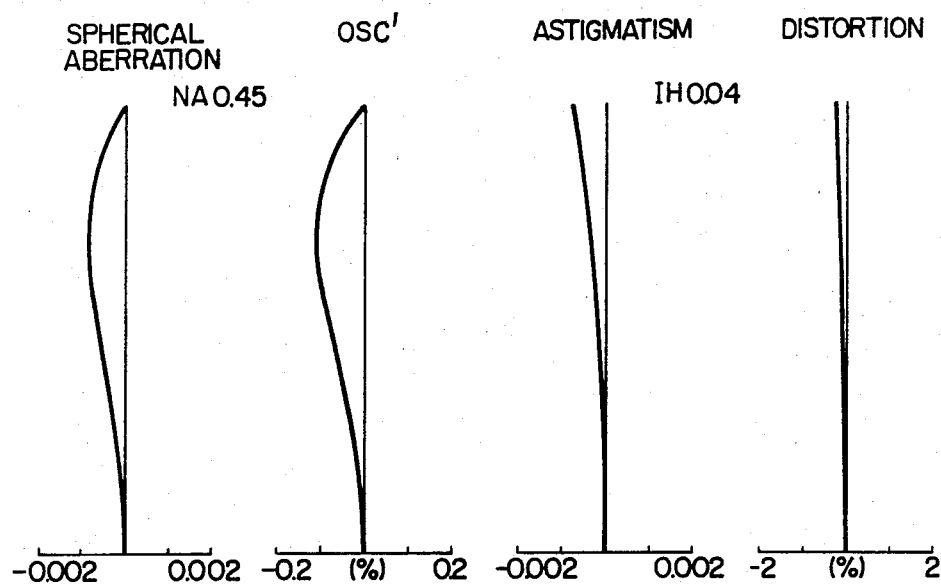
Figure 4:
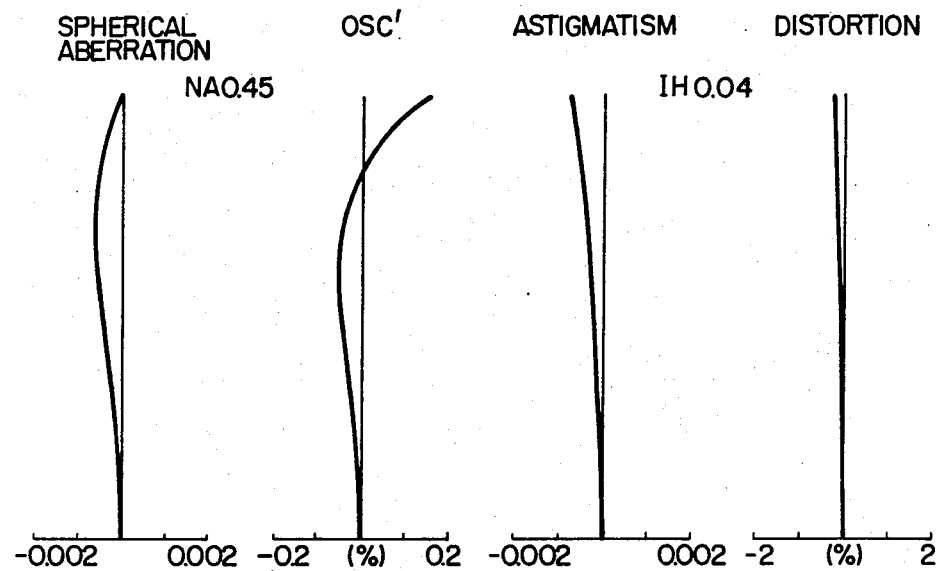
Figure 5:
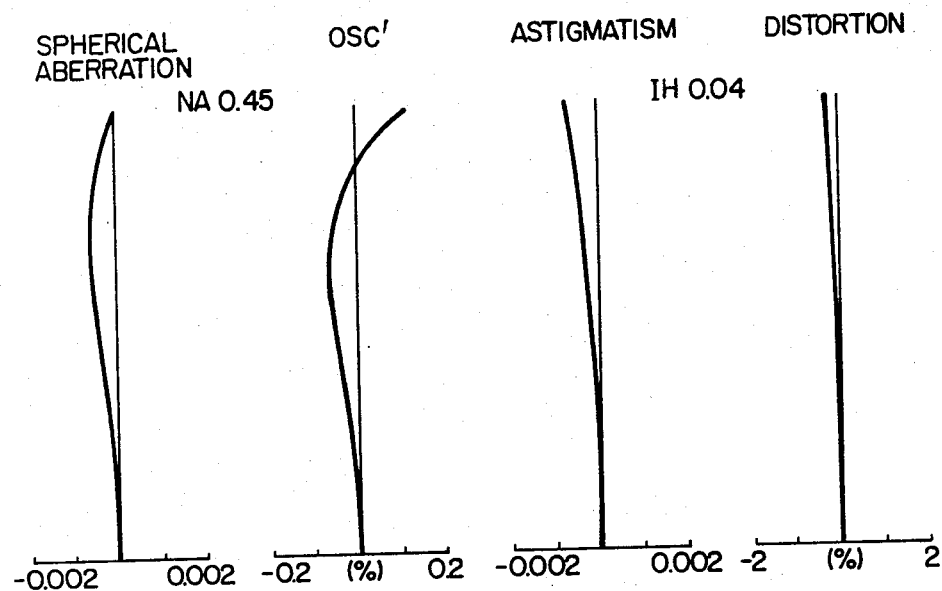
Figure 6:
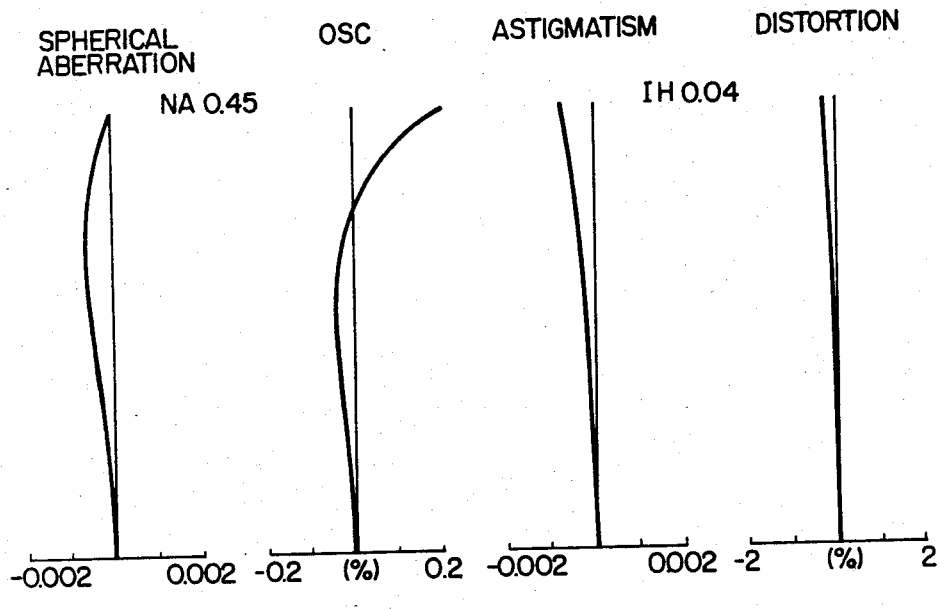
Figure 7:
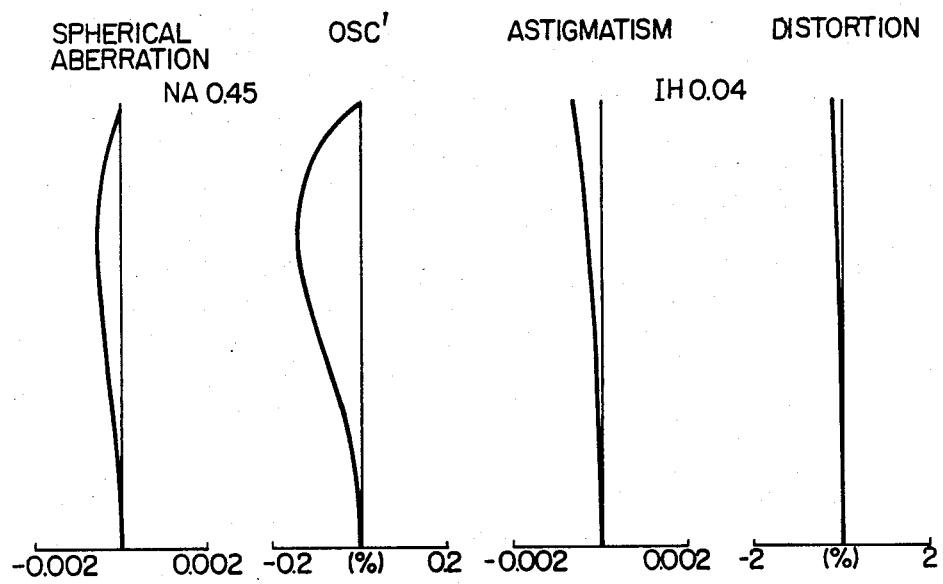
Figure 8:
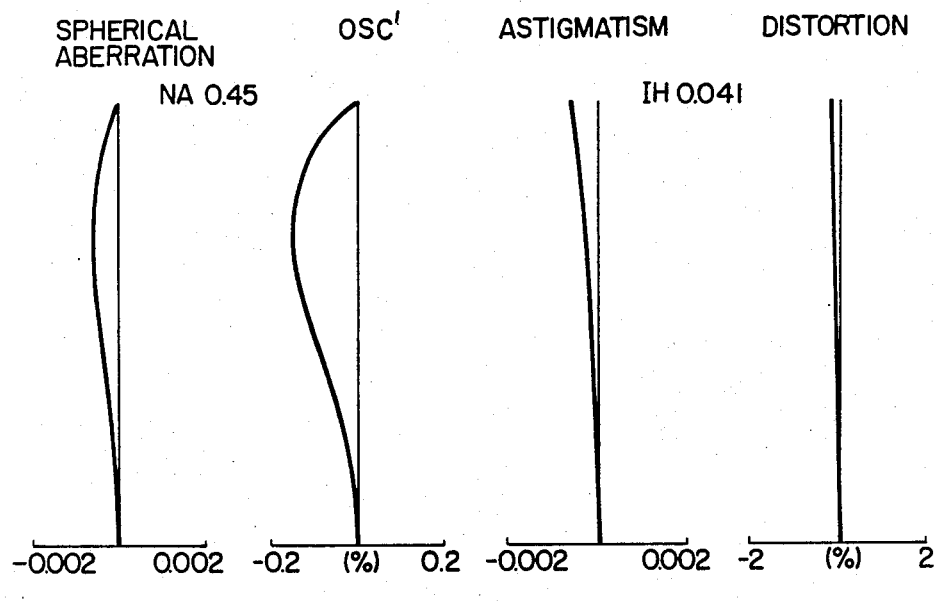
Figure 9:
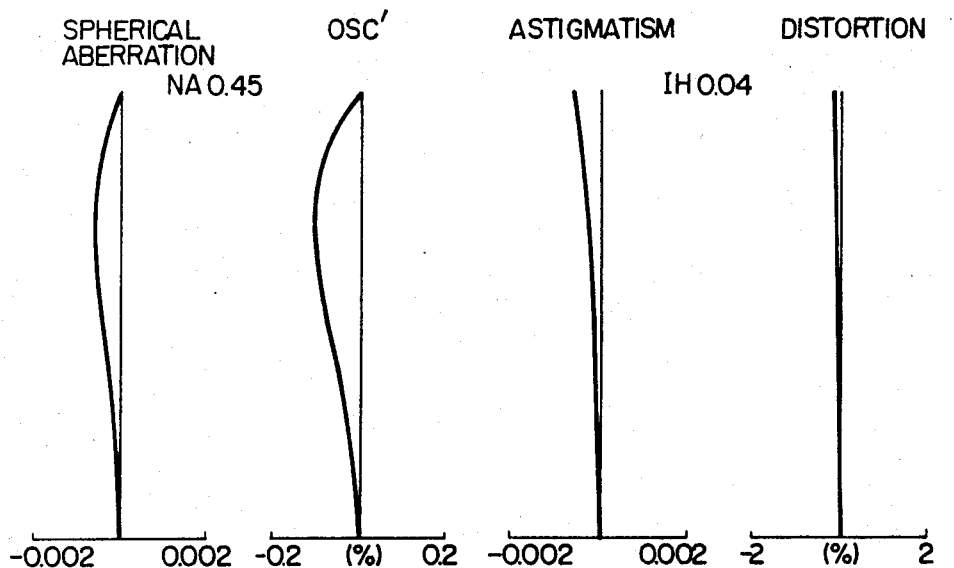
Figure 10:
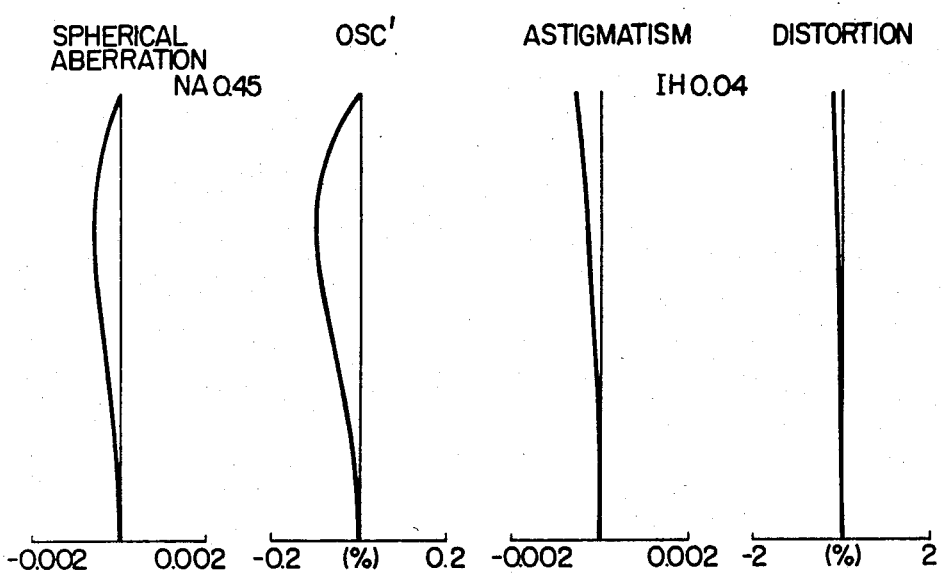
Figure 11:
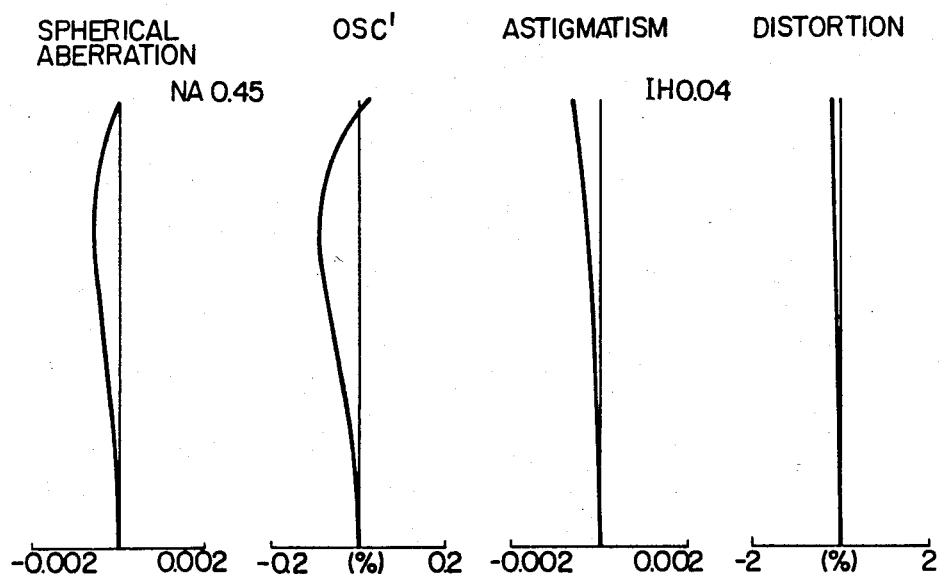
Figure 12:
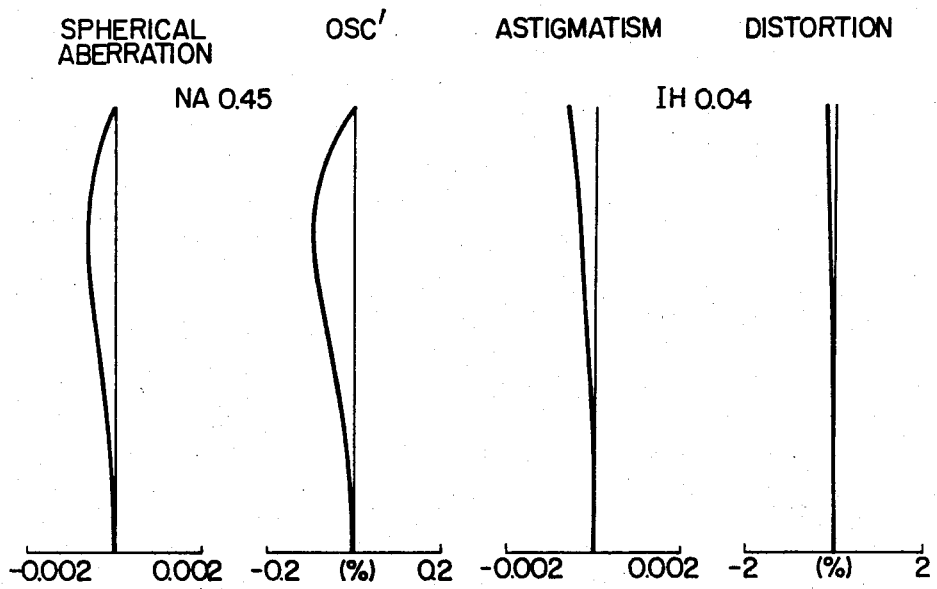
Figure 13:
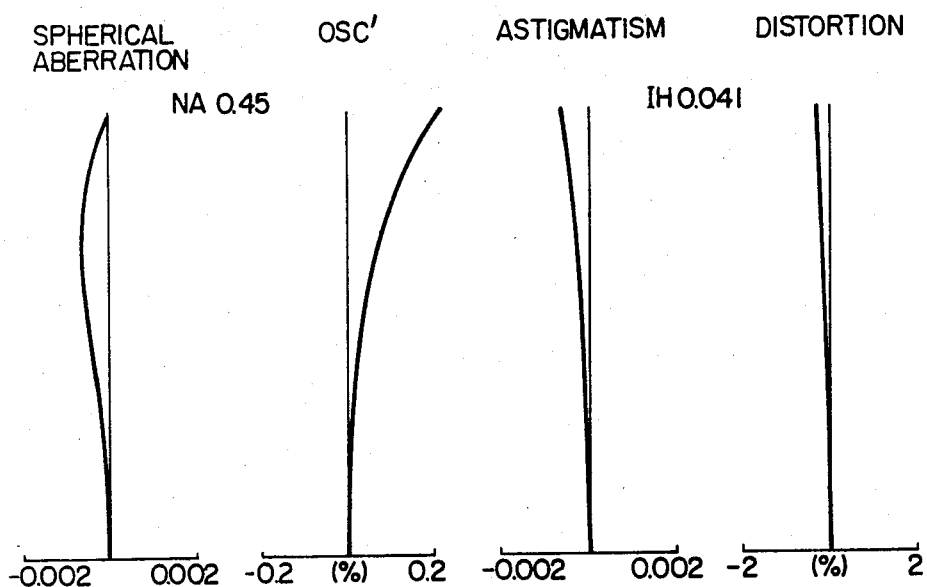
Figure 14:
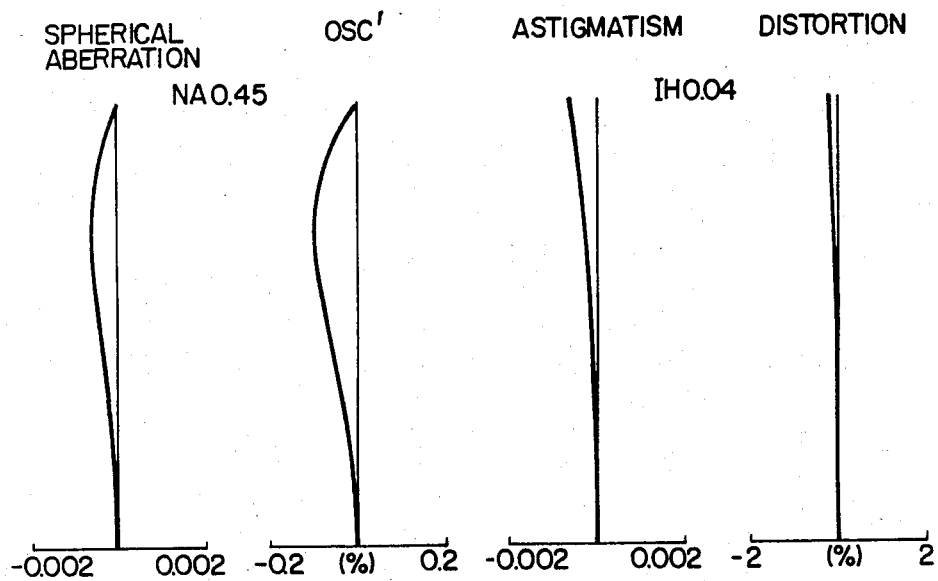
Figure 15:
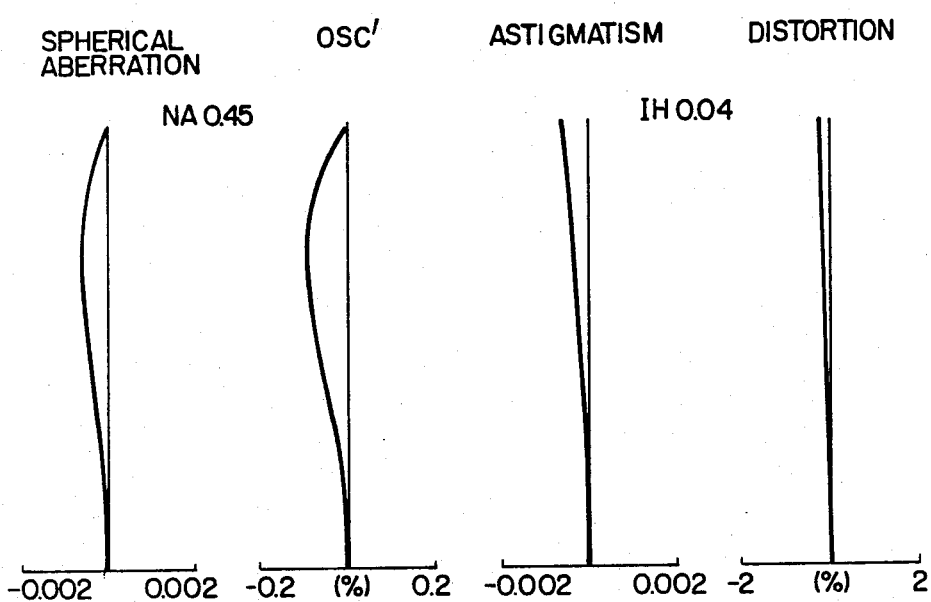

Preferred embodiments of the reproducing objective for video disks according to the present invention which satisfy the above-mentioned respective conditions are as shown below.

Embodiment 1
NA = 0.45    WD = 0.534    β = −1/18.5
$r_1$ = 3.0032
$d_1$ = 0.2322    $n_1$ = 1.59119    $v_1$ = 57.8
$r_2$ = −2.6218
$d_2$ = 0.0580
$r_3$ = −1.1963
$d_3$ = 0.3250    $n_2$ = 1.49819    $v_2$ = 57.8
$r_4$ = −2.4894
$d_4$ = 0.7545
$r_5$ = 2.1883
$d_5$ = 0.2322    $n_3$ = 1.59119    $v_3$ = 57.8
$r_6$ = −3.1827
$d_6$ = 0.0116
$r_7$ = 0.7015
$d_7$ = 0.1857    $n_4$ = 1.59119    $v_4$ = 57.8
$r_8$ = 2.1531
$t$ = 0.15    $n_t$ = 1.50
$f_1$ = 2.405    $f_2$ = −5.044
$f_3$ = 2.229    $f_4$ = 1.680
$f$ = 1

Embodiment 2
NA = 0.45    WD = 0.460    β = −1/18.5
$r_1$ = 2.0547
$d_1$ = 0.2300    $n_1$ = 1.4902    $v_1$ = 57.8
$r_2$ = −2.2681
$d_2$ = 0.0575
$r_3$ = −1.2145
$d_3$ = 0.3220    $n_2$ = 1.4902    $v_2$ = 57.8
$r_4$ = −2.2457
$d_4$ = 0.8165
$r_5$ = 1.2677
$d_5$ = 0.2300    $n_3$ = 1.4902    $v_3$ = 57.8
$r_6$ = −3.7974
$d_6$ = 0.0115
$r_7$ = 0.5727
$d_7$ = 0.1380    $n_4$ = 1.4902    $v_4$ = 57.8
$r_8$ = 1.7107
$t$ = 0.15    $n_t$ = 1.50
$f_1$ = 2.238    $f_2$ = −6.013
$f_3$ = 1.968    $f_4$ = 1.689
$f$ = 1

Embodiment 3
NA = 0.45    WD = 0.459    β = −1/18.5
$r_1$ = 2.3631
$d_1$ = 0.2296    $n_1$ = 1.49819    $v_1$ = 57.8
$r_2$ = −2.6102
$d_2$ = 0.0919
$r_3$ = −1.1435
$d_3$ = 0.3215    $n_2$ = 1.49819    $v_2$ = 57.8
$r_4$ = −1.7398
$d_4$ = 0.9186
$r_5$ = 1.1498
$d_5$ = 0.2067    $n_3$ = 1.49819    $v_3$ = 57.8
$r_6$ = −3.8750
$d_6$ = 0.0115
$r_7$ = 0.5679
$d_7$ = 0.1378    $n_4$ = 1.49819    $v_4$ = 57.8
$r_8$ = 1.4233
$t$ = 0.15    $n_t$ = 1.50

-continued $f_2$ = −8.160
$f_3$ = 1.805    $f_4$ = 1.800
$f$ = 1

Embodiment 4
NA = 0.45    WD = 0.460    β = −1/18.5
$r_1$ = 2.2811
$d_1$ = 0.2302    $n_1$ = 1.49819    $v_1$ = 57.8
$r_2$ = −2.6068
$d_2$ = 0.0575
$r_3$ = −1.1867
$d_3$ = 0.3222    $n_2$ = 1.49819    $v_2$ = 57.8
$r_4$ = −1.8608
$d_4$ = 0.8977
$r_5$ = 1.1534
$d_5$ = 0.2302    $n_3$ = 1.49819    $v_3$ = 57.8
$r_6$ = −3.9686
$d_6$ = 0.0115
$r_7$ = 0.5731
$d_7$ = 0.1381    $n_4$ = 1.49819    $v_4$ = 57.8
$r_8$ = 1.4170
$t$ = 0.15    $n_t$ = 1.50
$f_1$ = 2.481    $f_2$ = −7.818
$f_3$ = 1.821    $f_4$ = 1.832
$f$ = 1

Embodiment 5
NA = 0.45    WD = 0.460    β = −1/18.5
$r_1$ = 2.3727
$d_1$ = 0.2298    $n_1$ = 1.49819    $v_1$ = 57.8
$r_2$ = −2.5701
$d_2$ = 0.919
$r_3$ = −1.1415
$d_3$ = 0.3218    $n_2$ = 1.49819    $v_2$ = 57.8
$r_4$ = −1.7673
$d_4$ = 0.8963
$r_5$ = 1.1733
$d_5$ = 0.2298    $n_3$ = 1.49819    $v_3$ = 57.8
$r_6$ = −3.7409
$d_6$ = 0.0115
$r_7$ = 0.5716
$d_7$ = 0.1379    $n_4$ = 1.49819    $v_4$ = 57.8
$r_8$ = 1.4758
$t$ = 0.15    $n_t$ = 1.50
$f_1$ = 2.515    $f_2$ = −7.805
$f_3$ = 1.821    $f_4$ = 1.782
$f$ = 1

Embodiment 6
NA = 0.45    WD = 0.578    β = −1/18.5
$r_1$ = 3.7269
$d_1$ = 0.2312    $n_1$ = 1.49819    $v_1$ = 57.8
$r_2$ = −2.3833
$d_2$ = 0.0925
$r_3$ = −1.0641
$d_3$ = 0.2081    $n_2$ = 1.49819    $v_2$ = 57.8
$r_4$ = −1.6543
$d_4$ = 0.9249
$r_5$ = 1.5397
$d_5$ = 0.2081    $n_3$ = 1.49819    $v_3$ = 57.8
$r_6$ = −3.1801
$d_6$ = 0.0116
$r_7$ = 0.7601
$d_7$ = 0.1387    $n_4$ = 1.72309    $v_4$ = 28.46
$r_8$ = 1.8463
$t$ = 0.15    $n_t$ = 1.50
$f_1$ = 2.955    $f_2$ = −6.782
$f_3$ = 2.113    $f_4$ = 1.696
$f$ = 1

Embodiment 7
NA = 0.45    WD = 0.580    β = −1/18.5
$r_1$ = 3.9264
$d_1$ = 0.2321    $n_1$ = 1.49819    $v_1$ = 57.8
$r_2$ = −2.4314
$d_2$ = 0.0928
$r_3$ = −1.0479
$d_3$ = 0.2089    $n_2$ = 1.49819    $v_2$ = 57.8
$r_4$ = −1.6446
$d_4$ = 0.8704
$r_5$ = 1.6841
$d_5$ = 0.2321    $n_3$ = 1.49819    $v_3$ = 57.8
$r_6$ = −2.9405
$d_6$ = 0.116
$r_7$ = 0.8141

-continued

```
d7 = 0.1741      n4 = 1.77861     ν4 = 25.71
r8 = 1.8989
t = 0.15         nt = 1.50
f1 = 0.3051      f2 = -6.561
f3 = 2.186       f4 = 1.710
f = 1
```

Embodiment 8
```
NA = 0.45        WD = 0.530       β = -1/18.5
r1 = 2.7135
d1 = 0.2304      n1 = 1.49819     ν1 = 57.8
r2 = -2.3475
d2 = 0.0922
r3 = -1.1732
d3 = 0.2074      n2 = 1.49819     ν2 = 57.8
r4 = -2.2729
d4 = 0.9102
r5 = 2.3475
d5 = 0.2304      n3 = 1.49819     ν3 = 57.8
r6 = 2.7135
d6 = 0.0115
r7 = 0.7232
d7 = 0.1728      n4 = 1.77861     ν4 = 25.71
r8 = 1.8951
t = 0.15         nt = 1.50
f1 = 2.565       f2 = -5.193
f3 = 2.565       f4 = 1.411
f = 1
```

Embodiment 9
```
NA = 0.45        WD = 0.531       β = -1/18.5
r1 = 2.4705
d1 = 0.2306      n1 = 1.49819     ν1 = 57.8
r2 = -2.3810
d2 = 0.9022
r3 = -1.1846
d3 = 0.2075      n2 = 1.49819     ν2 = 57.8
r4 = -2.4965
d4 = 0.8647
r5 = 2.3810
d5 = 0.2306      n3 = 1.49819     ν3 = 57.8
r6 = -2.4705
d6 = 0.0115
r7 = 0.7225
d7 = 0.1729      n4 = 1.77861     ν4 = 25.71
r8 = 1.7879
t = 0.15         nt = 1.50
f1 = 2.473       f2 = -4.776
f3 = 2.473       f4 = 1.454
f = 1
```

Embodiment 10
```
NA = 0.45        WD = 0.531       β = -1/18.5
r1 = 2.3500
d1 = 0.2306      n1 = 1.49819     ν1 = 57.8
r2 = -2.4361
d2 = 0.0923
r3 = -1.1911
d3 = 0.2076      n2 = 1.49819     ν2 = 57.8
r4 = -2.6000
d4 = 0.8418
r5 = 2.3500
d5 = 0.2306      n3 = 1.49819     ν3 = 57.8
r6 = -2.4361
d6 = 0.0115
r7 = 0.7255
d7 = 0.1730      n4 = 1.77861     ν4 = 25.71
r8 = 1.7739
t = 0.15         nt = 1.50
f1 = 2.440       f2 = -4.639
f3 = 2.440       f4 = 1.470
f = 1
```

Embodiment 11
```
NA = 0.45        WD = 0.519       β = -1/18.5
r1 = 2.0414
d1 = 0.2306      n1 = 1.49819     ν1 = 57.8
r2 = -2.4915
d2 = 0.0922
r3 = -1.2311
d3 = 0.2079      n2 = 1.49819     ν2 = 57.8
r4 = -3.2939
d4 = 0.7955
r5 = 2.0414
d5 = 0.2306      n3 = 1.49819     ν3 = 57.8
r6 = -2.4915
d6 = 0.0115
r7 = 0.7239
d7 = 0.1729      n4 = 1.77861     ν4 = 25.71
r8 = 1.6673
t = 0.15         nt = 1.50
f1 = 2.291       f2 = -4.083
f3 = 2.291       f4 = 1.521
f = 1
```

Embodiment 12
```
NA = 0.45        WD = 0.466       β = -1/18.5
r1 = 1.4004
d1 = 0.3362      n1 = 1.49819     ν1 = 57.8
r2 = ∞
d2 = 0.0815
r3 = -1.1768
d3 = 0.6990      n2 = 1.49819     ν2 = 57.8
r4 = -1.4754
d4 = 0.5296
r5 = 1.4004
d5 = 0.3362      n3 = 1.49819     ν3 = 57.8
r6 = ∞
d6 = 0.0125
r7 = 0.5856
d7 = 0.1398      n4 = 1.77861     ν4 = 25.71
r8 = 1.0622
t = 0.15         nt = 1.50
f1 = 2.811       f2 = -52.675
f3 = 2.811       f4 = 1.485
f = 1
```

Embodiment 13
```
NA = 0.45        WD = 0.518       β = -1/18.5
r1 = 2.1493
d1 = 0.2304      n1 = 1.49020     ν1 = 57.8
r2 = -2.4314
d2 = 0.0922
r3 = -1.2120
d3 = 0.2074      n2 = 1.49020     ν2 = 57.8
r4 = -2.9160
d4 = 0.8296
r5 = 2.1493
d5 = 0.2304      n3 = 1.49020     ν3 = 57.8
r6 = -2.4314
d6 = 0.0115
r7 = 0.7141
d7 = 0.1728      n4 = 1.77861     ν4 = 25.71
r8 = 1.6709
t = 0.15         nt = 1.50
f1 = 2.366       f2 = -4.408
f3 = 2.366       f4 = 1.484
f = 1
```

Embodiment 14
```
NA = 0.45        WD = 0.518       β = -1/18.5
r1 = 2.0987
d1 = 0.2304      n1 = 1.49020     ν1 = 57.8
r2 = -2.7034
d2 = 0.0922
r3 = -1.2295
d3 = 0.2074      n2 = 1.49020     ν2 = 57.8
r4 = -2.7034
d4 = 0.8259
r5 = 2.0987
d5 = 0.2304      n3 = 1.49020     ν3 = 57.8
r6 = -2.7034
d6 = 0.0115
r7 = 0.7206
d7 = 0.1728      n4 = 1.77861     ν4 = 25.71
r8 = 1.7740
t = 0.15         nt = 1.50
f1 = 2.449       f2 = -4.824
f3 = 2.449       f4 = 1.454
f = 1
```

In the above-mentioned respective embodiments, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbol NA represents the numerical aperture, reference symbol WD represents the working distance (on the video disk side), reference symbol $\beta$ represent magnification, and reference symbol f represents the focal length of the lens system as a whole. As respective embodiments of the present invention are designed on the basis that a monochromatic light with the wavelength $\lambda=6328$ Å is used, all the refractive indices shown in the above are values at $\lambda=6328$ Å.

Aberration curves of the above-mentioned respective embodiments are shown in FIGS. 2 through 15. As for astigmatism in these graphs of aberration curves, $\Delta m$ and $\Delta s$ completely coincide with each other and, therefore, they are shown by the same curve.

Out of the above-mentioned embodiments, Embodiments 1 through 5 are arranged by using plastic lenses as all lenses which constitute the lens system while Embodiments 6 through 14 are arranged by using plastic lenses as the first, second and third lenses and optical glass for the fourth lens. As the fourth lens is to be exposed to the outside, it is sometimes more preferable to use a glass material from the view point of durability by taking the external and operating conditions when using the objective into consideration. Besides, for Embodiments 8 through 14, plastic lenses having the same shape and data are used as the first and third lenses and, therefore, these embodiments are advantageous especially for mass production.

Moreover, plastic lenses bring forth the following advantages. Unlike glass materials, plastic materials can be formed freely and, therefore, it is possible to intergrally form an annular projected portion along the circumference of each lens as shown by numerals 1, 2 and 3 in FIG. 1. When the lenses are formed as described in the above, it is not necessary to insert a spacer ring between the first and second lenses for the purpose of setting the airspace between them as it is evident from FIG. 1. Furthermore, it is not necessary to use supporting rings for lenses which are otherwise required when mounting the lenses to the lens barrel. Consequently, the number of parts constituting the objective is reduced. Therefore, the anti-vibration characteristic of objective is improved and it is possible to reduce the number of manhour for production and cost of production.

For all optical plastic materials available at present, the refractive index is 1.6 or less and this imposes a considerable restriction on the design of lenses. In spite of such restriction, the present invention provides an objective for video disks which maintains high performance equivalent to known objectives employing glass lenses and which is considerably lighter in weight.

I claim:

1. A reproducing objective for video disks comprising a first, second, third and fourth lenses in the order from the reproducing light source side to the video disk side, said first lens being a positive lens, said second lens being a negative meniscus lens, said third lens being a positive lens, said fourth lens being a positive meniscus lens, at least one of said lenses being arranged as a plastic lens, said reproducing objective for video disks fulfilling the following conditions:

(1) $2.1f < f_1 < 3.2f$
(2) $-55f < f_2 < -3.9f$
(3) $1.3f < f_4 < 2.4f$
(4) $f < r_8 < 2.3f$
(5) $d_2 < 0.1f$
(6) $0.5f < d_4$ wherein reference symbols $f_1$, $f_2$ and $f_4$ respectively represent focal lengths of the first, second and fourth lenses, reference symbol $r_8$ represents the radius of curvature of surface on the video disk side of the fourth lens, reference symbol $d_2$ represents the airspace between the first and second lenses, reference symbol $d_4$ represents the airspace between the second and third lenses, and reference symbol f represents the focal length of the lens system as a whole.

2. A reproducing objective for video disks according to claim 1, in which said reproducing objective for video disks has the following numerical data:

| | | |
|---|---|---|
| NA = 0.45 | WD = 0.534 | $\beta = -1/18.5$ |
| $r_1 = 3.0032$ | | |
| $d_1 = 0.2322$ | $n_1 = 1.59119$ | $\nu_1 = 57.8$ |
| $r_2 = -2.6218$ | | |
| $d_2 = 0.0580$ | | |
| $r_3 = -1.1963$ | | |
| $d_3 = 0.3250$ | $n_2 = 1.49819$ | $\nu_2 = 57.8$ |
| $r_4 = -2.4894$ | | |
| $d_4 = 0.7545$ | | |
| $r_5 = 2.1883$ | | |
| $d_5 = 0.2322$ | $n_3 = 1.59119$ | $\nu_3 = 57.8$ |
| $r_6 = -3.1827$ | | |
| $d_6 = 0.0116$ | | |
| $r_7 = 0.7015$ | | |
| $d_7 = 0.1857$ | $n_4 = 1.59119$ | $\nu_4 = 57.8$ |
| $r_8 = 2.1531$ | | |
| $t = 0.15$ | $n_t = 1.50$ | |
| $f_1 = 2.405$ | $f_2 = -5.044$ | |
| $f_3 = 2.229$ | $f_4 = 1.680$ | |
| $f = 1$ | | | wherein reference symbols $r_1$ through $r_8$ repsectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda=6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

3. A reproducing objective for video disks according to claim 1, in which said reproducing objective for video disks has the following numerical data:

| | | |
|---|---|---|
| NA = 0.45 | WD = 0.460 | $\beta = -1/18.5$ |
| $r_1 = 2.0547$ | | |
| $d_1 = 0.2300$ | $n_1 = 1.4902$ | $\nu_1 = 57.8$ |
| $r_2 = 2.2681$ | | |
| $d_2 = 0.0575$ | | |
| $r_3 = -1.2145$ | | |
| $d_3 = 0.3220$ | $n_2 = 1.4902$ | $\nu_2 = 57.8$ |
| $r_4 = -2.2457$ | | |
| $d_4 = 0.8165$ | | |
| $r_5 = 1.2677$ | | |
| $d_5 = 0.2300$ | $n_3 = 1.4902$ | $\nu_3 = 57.8$ |
| $r_6 = -3.7974$ | | |
| $d_6 = 0.0115$ | | |
| $r_7 = 0.5727$ | | |
| $d_7 = 0.1380$ | $n_4 = 1.4902$ | $\nu_4 = 57.8$ |
| $r_8 = 1.7107$ | | |
| $t = 0.15$ | $n_t = 1.50$ | |

-continued

| | |
|---|---|
| $f_1 = 2.238$ | $f_2 = -6.013$ |
| $f_3 = 1.968$ | $f_4 = 1.689$ |
| $f = 1$ | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda = 6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

4. A reproducing objective for video disks according to claim 1, in which said reproducing objective for video disks has the following numerical data:

| | | |
|---|---|---|
| NA = 0.45 | WD = 0.459 | $\beta = -1/18.5$ |
| $r_1 = 2.3631$ | | |
| $d_1 = 0.2296$ | $n_1 = 1.49819$ | $\nu_1 = 57.8$ |
| $r_2 = -2.6102$ | | |
| $d_2 = 0.0919$ | | |
| $r_3 = -1.1435$ | | |
| $d_3 = 0.3215$ | $n_2 = 1.49819$ | $\nu_2 = 57.8$ |
| $r_4 = -1.7398$ | | |
| $d_4 = 0.9186$ | | |
| $r_5 = 1.1498$ | | |
| $d_5 = 0.2067$ | $n_3 = 1.49819$ | $\nu_3 = 57.8$ |
| $r_6 = -3.8750$ | | |
| $d_6 = 0.0115$ | | |
| $r_7 = 0.5679$ | | |
| $d_7 = 0.1378$ | $n_4 = 1.49819$ | $\nu_4 = 57.8$ |
| $r_8 = 1.4233$ | | |
| $t = 0.15$ | $n_t = 1.50$ | |
| $f_1 = 2.528$ | $f_2 = -8.160$ | |
| $f_3 = 1.805$ | $f_4 = 1.800$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent indices of respective lenses, reference symbols $\nu_1$, $\nu_2$, $\nu_3$ and $\nu_4$ respectively represent Abbe's numbers of respective lenses at $\lambda = 6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

5. A reproducing objective for video disks according to claim 1, in which said reproducing objective for video disks has the following numerical data:

| | | |
|---|---|---|
| NA = 0.45 | WD = 0.460 | $\beta = -1/18.5$ |
| $r_1 = 2.2811$ | | |
| $d_1 = 0.2302$ | $n_1 = 1.49819$ | $\nu_1 = 57.8$ |
| $r_2 = -2.6068$ | | |
| $d_2 = 0.0575$ | | |
| $r_3 = -1.1867$ | | |
| $d_3 = 0.3222$ | $n_2 = 1.49819$ | $\nu_2 = 57.8$ |
| $r_4 = -1.8606$ | | |
| $d_4 = 0.8977$ | | |
| $r_5 = 1.1534$ | | |
| $d_5 = 0.2302$ | $n_3 = 1.49819$ | $\nu_3 = 57.8$ |
| $r_6 = -3.9686$ | | |
| $d_6 = 0.0115$ | | |
| $r_7 = 0.5731$ | | |
| $d_7 = 0.1381$ | $n_4 = 1.49819$ | $\nu_4 = 57.8$ |
| $r_8 = 1.4170$ | | |
| $t = 0.15$ | $n_t = 1.50$ | |
| $f_1 = 2.481$ | $f_2 = -7.818$ | |
| $f_3 = 1.821$ | $f_4 = 1.832$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda = 6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

6. A reproducing objective for video disks according to claim 1, in which said reproducing objective for video disks has the following numerical data:

| | | |
|---|---|---|
| NA = 0.45 | WD = 0.460 | $\beta = -1/18.5$ |
| $r_1 = 2.3727$ | | |
| $d_1 = 0.2298$ | $n_1 = 1.49819$ | $\nu_1 = 57.8$ |
| $r_2 = -2.5701$ | | |
| $d_2 = 0.0919$ | | |
| $r_3 = -1.1415$ | | |
| $d_3 = 0.3218$ | $n_2 = 1.49819$ | $\nu_2 = 57.8$ |
| $r_4 = -1.7673$ | | |
| $d_4 = 0.8963$ | | |
| $r_5 = 1.1733$ | | |
| $d_5 = 0.2298$ | $n_3 = 1.49819$ | $\nu_3 = 57.8$ |
| $r_6 = -3.7409$ | | |
| $d_6 = 0.0115$ | | |
| $r_7 = 0.5716$ | | |
| $d_7 = 0.1379$ | $n_4 = 1.49819$ | $\nu_4 = 57.8$ |
| $r_8 = 1.4758$ | | |
| $t = 0.15$ | $n_t = 1.50$ | |
| $f_1 = 2.515$ | $f_2 = -7.805$ | |
| $f_3 = 1.821$ | $f_4 = 1.782$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda = 6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

7. A reproducing objective for video disks according to claim 1, in which said reproducing objective for video disks has the following numerical data:

| NA = 0.45 | WD = 0.578 | $\beta = -1/18.5$ |
|---|---|---|
| $r_1 = 3.7269$ | | |
| $d_1 = 0.2312$ | $n_1 = 1.49819$ | $\nu_1 = 57.8$ |
| $r_2 = -2.3833$ | | |
| $d_2 = 0.0925$ | | |
| $r_3 = -1.0641$ | | |
| $d_3 = 0.2081$ | $n_2 = 1.49819$ | $\nu_2 = 57.8$ |
| $r_4 = -1.6543$ | | |
| $d_4 = 0.9249$ | | |
| $r_5 = 1.5397$ | | |
| $d_5 = 0.2081$ | $n_3 = 1.49819$ | $\nu_3 = 57.8$ |
| $r_6 = -3.1801$ | | |
| $d_6 = 0.0116$ | | |
| $r_7 = 0.7601$ | | |
| $d_7 = 0.1387$ | $n_4 = 1.72309$ | $\nu_4 = 28.46$ |
| $r_8 = 1.8463$ | | |
| $t = 0.15$ | $n_t = 1.50$ | |
| $f_1 = 2.955$ | $f_2 = -6.782$ | |
| $f_2 = 2.113$ | $f_4 = 1.696$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda = 6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

8. A reproducing objective for video disks according to claim 1, in which said reproducing objective for video disks has the following numerical data:

| NA = 0.45 | WD = 0.580 | $\beta = -1/18.5$ |
|---|---|---|
| $r_1 = 3.9264$ | | |
| $d_1 = 0.2321$ | $n_1 = 1.49819$ | $\nu_1 = 57.8$ |
| $r_2 = -2.4314$ | | |
| $d_2 = 0.0928$ | | |
| $r_3 = -1.0479$ | | |
| $d_3 = 0.2089$ | $n_2 = 1.49819$ | $\nu_2 = 57.8$ |
| $r_4 = -1.6446$ | | |
| $d_4 = 0.8704$ | | |
| $r_5 = 1.6841$ | | |
| $d_5 = 0.2321$ | $n_3 = 1.49819$ | $\nu_3 = 57.8$ |
| $r_6 = -2.9405$ | | |
| $d_6 = 0.116$ | | |
| $r_7 = 0.8141$ | | |
| $d_7 = 0.1741$ | $n_4 = 1.77861$ | $\nu_4 = 25.71$ |
| $r_8 = 1.8989$ | | |
| $t = 0.15$ | $n_t = 1.50$ | |
| $f_1 = 3.051$ | $f_2 = -6.561$ | |
| $f_3 = 2.186$ | $f_4 = 1.710$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda = 6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

9. A reproducing objective for video disks according to claim 1, in which said reproducing objective for video disks has the following numerical data:

| NA = 0.45 | WD = 0.530 | $\beta = -1/18.5$ |
|---|---|---|
| $r_1 = 2.7135$ | | |
| $d_1 = 0.2304$ | $n_1 = 1.49819$ | $\nu_1 = 57.8$ |
| $r_2 = -2.3475$ | | |
| $d_2 = 0.0922$ | | |
| $r_3 = -1.1732$ | | |
| $d_3 = 0.2074$ | $n_2 = 1.49819$ | $\nu_2 = 57.8$ |
| $r_4 = -2.2729$ | | |
| $d_4 = 0.9102$ | | |
| $r_5 = 2.3475$ | | |
| $d_5 = 0.2304$ | $n_3 = 1.49819$ | $\nu_3 = 57.8$ |
| $r_6 = -2.7135$ | | |
| $d_6 = 0.0115$ | | |
| $r_7 = 0.7232$ | | |
| $d_7 = 0.1728$ | $n_4 = 1.77861$ | $\nu_4 = 25.71$ |
| $r_8 = 1.8951$ | | |
| $t = 0.15$ | $n_t = 1.50$ | |
| $f_1 = 2.565$ | $f_2 = -5.193$ | |
| $f_3 = 2.565$ | $f_4 = 1.411$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda = 6328$ Å, reference symbol t represents the thickness of cover glass, reference symbol $t_n$ represents the refractive index of cover glass, reference symbol NA represents the numerical aperture, reference symbol WD represents the workding distance, reference symbol $\beta$ represents magnification, and reference symbol f represents the focal length of the lens system as a whole.

10. A reproducing objective for video disks according to claim 1, in which said reproducing objective for video disks has the following numerical data:

| NA = 0.45 | WD = 0.531 | $\beta = -1/18.5$ |
|---|---|---|
| $r_1 = 2.4705$ | | |
| $d_1 = 0.2306$ | $n_1 = 1.49819$ | $\nu_1 = 57.8$ |
| $r_2 = -2.3810$ | | |
| $d_2 = 0.0922$ | | |
| $r_3 = -1.1846$ | | |
| $d_3 = 0.2075$ | $n_2 = 1.49819$ | $\nu_2 = 57.8$ |
| $r_4 = -2.4965$ | | |
| $d_4 = 0.8647$ | | |
| $r_5 = 2.3810$ | | |
| $d_5 = 0.2306$ | $n_3 = 1.49819$ | $\nu_3 = 57.8$ |
| $r_6 = -2.4705$ | | |
| $d_6 = 0.0115$ | | |
| $r_7 = 0.7225$ | | |
| $d_7 = 0.1729$ | $n_4 = 1.77861$ | $\nu_4 = 25.71$ |
| $r_8 = 1.7879$ | | |
| $t = 0.15$ | $n_t = 1.50$ | |
| $f_1 = 2.473$ | $f_2 = 4.776$ | |
| $f_3 = 2.473$ | $f_4 = 1.454$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda=6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

11. A reproducing objective for video disks according to claim 1, in which said reproducing objective for video disks has the following numerical data:

| | | |
|---|---|---|
| NA = 0.45 | WD = 0.531 | $\beta = -1/18.5$ |
| $r_1 = 2.3500$ | | |
| $d_1 = 0.2306$ | $n_1 = 1.49819$ | $\nu_1 = 57.8$ |
| $r_2 = -2.4361$ | | |
| $d_2 = 0.0923$ | | |
| $r_3 = -1.1911$ | | |
| $d_3 = 0.2076$ | $n_2 = 1.49819$ | $\nu_2 = 57.8$ |
| $r_4 = -2.6000$ | | |
| $d_4 = 0.8418$ | | |
| $r_5 = 2.3500$ | | |
| $d_5 = 0.2306$ | $n_3 = 1.49819$ | $\nu_3 = 57.8$ |
| $r_6 = -2.4361$ | | |
| $d_6 = 0.0115$ | | |
| $r_7 = 0.7255$ | | |
| $d_7 = 0.1730$ | $n_4 = 1.77861$ | $\nu_4 = 25.71$ |
| $r_8 = 1.7739$ | | |
| $t = 0.15$ | $n_t = 1.50$ | |
| $f_1 = 2.440$ | $f_2 = -4.639$ | |
| $f_3 = 2.440$ | $f_4 = 1.470$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda=6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

12. A reproducing objective for video disks according to claim 1, in which said reproducing objective for video disks has the following numerical data:

| | | |
|---|---|---|
| NA = 0.45 | WD = 0.519 | $\beta = -1/18.5$ |
| $r_1 = 2.0414$ | | |
| $d_1 = 0.2306$ | $n_1 = 1.49819$ | $\nu_1 = 57.8$ |
| $r_2 = -2.4915$ | | |
| $d_2 = 0.0922$ | | |
| $r_3 = -1.2311$ | | |
| $d_3 = 0.2079$ | $n_2 = 1.49819$ | $\nu_2 = 57.8$ |
| $r_4 = -3.2939$ | | |
| $d_4 = 0.7955$ | | |
| $r_5 = 2.0414$ | | |
| $d_5 = 0.2306$ | $n_3 = 1.49819$ | $\nu_3 = 57.8$ |
| $r_6 = -2.4915$ | | |
| $d_6 = 0.0115$ | | |
| $r_7 = 0.7239$ | | |
| $d_7 = 0.1729$ | $n_4 = 1.77861$ | $\nu_4 = 25.71$ |
| $r_8 = 1.6673$ | | |
| $t = 0.15$ | $n_t = 1.50$ | |
| $f_1 = 2.291$ | $f_2 = -4.083$ | |
| $f_3 = 2.291$ | $f_4 = 1.521$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda=6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

13. A reproducing objective for video disks according to claim 1, in which said reproducing objective for video disks has the following numerical data:

| | | |
|---|---|---|
| NA = 0.45 | WD = 0.466 | $\beta = -1/18.5$ |
| $r_1 = 1.4004$ | | |
| $d_1 = 0.3362$ | $n_1 = 1.49819$ | $\nu_1 = 57.8$ |
| $r_2 = \infty$ | | |
| $d_2 = 0.0815$ | | |
| $r_3 = -1.1768$ | | |
| $d_3 = 0.6990$ | $n_2 = 1.49819$ | $\nu_2 = 57.8$ |
| $r_4 = -1.4754$ | | |
| $d_4 = 0.5296$ | | |
| $r_5 = 1.4004$ | | |
| $d_5 = 0.3362$ | $n_3 = 1.49819$ | $\nu_3 = 57.8$ |
| $r_6 = \infty$ | | |
| $d_6 = 0.0125$ | | |
| $r_7 = 0.5856$ | | |
| $d_7 = 0.1398$ | $n_4 = 1.77861$ | $\nu_4 = 25.71$ |
| $r_8 = 1.0622$ | | |
| $t = 0.15$ | $n_t = 1.50$ | |
| $f_1 = 2.811$ | $f_2 = -52.675$ | |
| $f_3 = 2.811$ | $f_4 = 1.485$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda=6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

14. A reproducing objective for video disks according to claim 1, in which said reproducing objective for video disks has the following numerical data:

| | | |
|---|---|---|
| NA = 0.45 | WD = 0.518 | $\beta = -1/18.5$ |
| $r_1 = 2.1493$ | | |
| $d_1 = 0.2304$ | $n_1 = 1.49020$ | $\nu_1 = 57.8$ |
| $r_2 = -2.4314$ | | |
| $d_2 = 0.0922$ | | |

-continued

| | | |
|---|---|---|
| $r_3 = -1.2120$ | | |
| $d_3 = 0.2074$ | $n_2 = 1.49020$ | $\nu_2 = 57.8$ |
| $r_4 = -2.9160$ | | |
| $d_4 = 0.8296$ | | |
| $r_5 = 2.1493$ | | |
| $d_5 = 0.2304$ | $n_3 = 1.49020$ | $\nu_3 = 57.8$ |
| $r_6 = -2.4314$ | | |
| $d_6 = 0.0115$ | | |
| $r_7 = 0.7141$ | | |
| $d_7 = 0.1728$ | $n_4 = 1.77861$ | $\nu_4 = 25.71$ |
| $r_8 = 1.6709$ | | |
| $t = 0.15$ | $n_t = 1.50$ | |
| $f_1 = 2.366$ | $f_2 = -4.408$ | |
| $f_3 = 2.366$ | $f_4 = 1.484$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda = 6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

15. A reproducing objective for video disks according to claim 1, in which said reproducing objective for video disks has the following numerical data:

| | | |
|---|---|---|
| NA = 0.45 | WD = 0.518 | $\beta = -1/18.5$ |
| $r_1 = 2.0987$ | | |
| $d_1 = 0.2304$ | $n_1 = 1.49020$ | $\nu_1 = 57.8$ |
| $r_2 = -2.7034$ | | |
| $d_2 = 0.0922$ | | |
| $r_3 = -1.2295$ | | |
| $d_3 = 0.2074$ | $n_2 = 1.49020$ | $\nu_2 = 57.8$ |
| $r_4 = -2.7034$ | | |
| $d_4 = 0.8259$ | | |
| $r_5 = 2.0987$ | | |
| $d_5 = 0.2304$ | $n_3 = 1.49020$ | $\nu_3 = 57.8$ |
| $r_6 = -2.7034$ | | |
| $d_6 = 0.0115$ | $r_7 = 0.7206$ | |
| $d_7 = 0.1728$ | $n_4 = 1.77861$ | $\nu_4 = 25.71$ |
| $r_8 = 1.7740$ | | |
| $t = 0.15$ | $n_t = 1.50$ | |
| $f_1 = 2.449$ | $f_2 = -4.824$ | |
| $f_3 = 2.449$ | $f_4 = 1.454$ | |
| $f = 1$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses at $\lambda = 6328$ Å, reference symbol t represents the thickness of cover glass, reference symbol $t_n$ represents the refractive index of cover glass, reference symbol NA represents the numerical aperture, reference symbol WD represents the working distance, reference symbol $\beta$ represents magnification, and reference symbol f represents the focal length of the lens system as a whole.

* * * * *

Disclaimer

4,332,442.—*Kaneyas Ookawa*, Tokyo, Japan. REPRODUCING OBJECTIVE FOR VIDEO DISKS. Patent dated June 1, 1982. Disclaimer filed July 20, 1982, by the assignee, *Olympus Optical Co. Ltd.*

The term of this patent subsequent to March 24, 1998 has been disclaimed.

[*Official Gazette October 5, 1982.*]